US008429368B2

(12) United States Patent
Eisler et al.

(10) Patent No.: US 8,429,368 B2
(45) Date of Patent: Apr. 23, 2013

(54) PROVIDING AN ADMINISTRATIVE PATH FOR ACCESSING A WRITEABLE MASTER STORAGE VOLUME IN A MIRRORED STORAGE ENVIRONMENT

(75) Inventors: Michael Eisler, Colorado Springs, CO (US); Peter F. Corbett, Lexington, MA (US); Michael L. Kazar, Pittsburgh, PA (US); Daniel S. Nydick, Wexford, PA (US); J. Christopher Wagner, San Francisco, CA (US)

(73) Assignee: NetApp, Inc., Sunnyvale, CA (US)

( * ) Notice: Subject to any disclaimer, the term of this patent is extended or adjusted under 35 U.S.C. 154(b) by 1074 days.

(21) Appl. No.: 12/129,904

(22) Filed: May 30, 2008

(65) Prior Publication Data

US 2009/0024814 A1    Jan. 22, 2009

Related U.S. Application Data

(60) Provisional application No. 60/941,293, filed on Jun. 1, 2007.

(51) Int. Cl.
*G06F 12/00* (2006.01)

(52) U.S. Cl.
USPC ............ 711/170; 711/118; 711/147; 711/154

(58) Field of Classification Search ............... 711/170, 711/147, 118, 154
See application file for complete search history.

(56) References Cited

U.S. PATENT DOCUMENTS

| 5,819,292 | A | 10/1998 | Hitz et al. |
| 6,671,773 | B2 | 12/2003 | Kazar et al. |
| 6,978,324 | B1 * | 12/2005 | Black ............................ 710/31 |
| 7,584,337 | B2 * | 9/2009 | Rowan et al. ................. 711/162 |
| 7,627,873 | B1 * | 12/2009 | Pathak et al. ................. 719/321 |
| 2002/0083037 | A1 | 6/2002 | Lewis et al. |

OTHER PUBLICATIONS

'How to Use Automatic Completion with a Command Prompt in Windows XP', Microsoft, Accessed from support.microsoft.com/kb/310530 on Dec. 16, 2012, Published on Jul. 15, 2004.*
U.S. Appl. No. 60/941,293 for Providing an Administrative Path for Accessing a Writable Master Storage Volume in a Mirrored Storage Environment, by Michael Eisler, et al., on Jun. 1, 2007, 39 pages.
U.S. Appl. No. 11/119,279 for System and Method for Implementing Atomic Cross-Stripe Write Operations in a Striped Volume Set, by Jernigan, IV, et al., on Apr. 29, 2005, 60 pages.

(Continued)

*Primary Examiner* — Matthew Bradley
(74) *Attorney, Agent, or Firm* — Cesari and McKenna, LLP

(57) ABSTRACT

A technique provides an administrative path for accessing a writeable master storage volume in a mirrored storage environment. Illustratively, a writeable master storage volume stores a master set of data addressable by a corresponding pathname, and zero or more read-only (e.g., load-balancing) mirrored storage volumes are configured to store a mirrored set of the master set of data, the mirrored set also addressable by the corresponding pathname. Clients may read data from either the master storage volume or one of the mirrored storage volumes (e.g., according to a configured access location, such as a local mirrored volume if one exists) by issuing read requests having the corresponding pathnames. Also, each client may specifically access the master set of data from the master storage volume by issuing an access (e.g., read/write) request having a specified master storage volume pathname prefix prepended to the corresponding pathname.

20 Claims, 4 Drawing Sheets

OTHER PUBLICATIONS

U.S. Appl. No. 11/499,493 for Enabling a Clustered Namespace With Redirection, by Michael Kazar et al., on Apr. 29, 2005, 42 pages.

U.S. Appl. No. 11/118,466 for System and Method for Multiplexing Channels Over Multiple Connections in a Storage System Cluster, by Corbett et al., on Apr. 29, 2005, 39 pages.

Hitz, Dave, et al., "File System Design for an NFS File Server Appliance", Technical Report 3002, Presented Jan. 19, 1994, USENIX Winter 1994, San Francisco, CA, The USENIX Association, Network Appliance, Rev. C3/95, 23 pages.

* cited by examiner

PROVIDING AN ADMINISTRATIVE PATH FOR ACCESSING A WRITEABLE MASTER STORAGE VOLUME IN A MIRRORED STORAGE ENVIRONMENT

RELATED APPLICATION

This application claims the benefit of U.S. Provisional Application Ser. No. 60/941,293, entitled PROVIDING AN ADMINISTRATIVE PATH FOR ACCESSING A WRITEABLE MASTER STORAGE VOLUME IN A MIRRORED STORAGE ENVIRONMENT, filed by Michael Eisler, et al. on Jun. 1, 2007, the teachings of which are expressly incorporated by reference.

FIELD OF THE INVENTION

The present invention is directed to storage systems and, in particular, to providing an administrative path for accessing a writeable master storage volume in a mirrored storage environment.

BACKGROUND OF THE INVENTION

A storage system typically comprises one or more storage devices into which information may be entered, and from which information may be obtained, as desired. The storage system includes a storage operating system that functionally organizes the system by, inter alia, invoking storage operations in support of a storage service implemented by the system. The storage system may be implemented in accordance with a variety of storage architectures including, but not limited to, a network-attached storage (NAS) environment, a storage area network (SAN), and a disk assembly directly attached to a client or host computer. The storage devices are typically disk drives organized as a disk array, wherein the term "disk" commonly describes a self-contained rotating magnetic media storage device. The term disk in this context is synonymous with hard disk drive (HDD) or direct access storage device (DASD).

The storage operating system of the storage system may implement a high-level module, such as a file system, to logically organize the information stored on volumes as a hierarchical structure of data containers, such as files and logical units. For example, each "on-disk" file may be implemented as set of data structures, i.e., disk blocks, configured to store information, such as the actual data for the file. These data blocks are organized within a volume block number (vbn) space that is maintained by the file system. The file system may also assign each data block in the file a corresponding "file offset" or file block number (fbn). The file system typically assigns sequences of fbns on a per-file basis, whereas vbns are assigned over a larger volume address space. The file system organizes the data blocks within the vbn space as a "logical volume"; each logical volume may be, although is not necessarily, associated with its own file system.

A known type of file system is a write-anywhere file system that does not overwrite data on disks. If a data block is retrieved (read) from disk into a memory of the storage system and "dirtied" (i.e., updated or modified) with new data, the data block is thereafter stored (written) to a new location on disk to optimize write performance. A write-anywhere file system may initially assume an optimal layout such that the data is substantially contiguously arranged on disks. The optimal disk layout results in efficient access operations, particularly for sequential read operations, directed to the disks.

An example of a write-anywhere file system that is configured to operate on a storage system is the Write Anywhere File Layout (WAFL™) file system available from Network Appliance, Inc., Sunnyvale, Calif.

The storage system may be further configured to operate according to a client/server model of information delivery to thereby allow many clients to access data containers, such as files and logical units, stored on the system. In this model, the client may comprise an application, such as a database application, executing on a computer that "connects" to the storage system over a computer network, such as a point-to-point link, shared local area network (LAN), wide area network (WAN), or virtual private network (VPN) implemented over a public network such as the Internet. Each client may request the services of the storage system by issuing file-based and block-based protocol messages (in the form of packets) to the system over the network.

In order to improve reliability and facilitate disaster recovery in the event of a failure of a storage system, its associated disks, or some portion of the storage infrastructure, it is common to "mirror" or replicate a data set comprising some or all of the underlying data and/or the file system that organizes the data. A data set comprises an area of defined storage which may have a mirroring relationship associated therewith. Examples of data sets include, e.g., a file system, a volume, or a persistent consistency point image (PCPI), described further below.

In one example, a mirror of a file system is established and stored at a destination, making it more likely that recovery is possible in the event of a true disaster that may physically damage a source storage location or its infrastructure (e.g. a flood, power outage, act of war, etc.). The mirror is updated at regular intervals, typically set by an administrator, in an effort to maintain the most recent changes to the file system on the destination. The storage systems attempt to ensure that the mirror is consistent, that is that the mirror contains identical data to that of the source.

In addition to being used for improved reliability and to facilitate disaster recovery, mirrors may also be used for load balancing data access requests. In particular, a distributed storage system environment may provide access to a data set (e.g., a volume) for a large number of clients. As such, the large number of corresponding access requests for that data set may become a bottleneck, where generally one particular storage system maintaining the data set services each of the requests. For instance, where a root volume is stored at the particular storage system, each access request to the root volume is serviced by that storage system (as will be understood by those skilled in the art). To pre-vent that storage system from becoming a bottleneck, one technique is to provide read-only load-balancing mirrors of the data set stored on one or more of the storage systems of the distributed storage system environment. In particular, a data set that is accessed often, yet that is not modified often (e.g., the root volume), is a good candidate for mirroring. In this manner, any read-only access request from a client for the mirrored data set (e.g., the root volume) may be serviced from any storage system having a mirrored copy, thus alleviating the bottleneck at the storage system maintaining the original version of the mirrored data set (the "master" data set or volume).

By creating multiple read-only "replicas" of a data set and/or volume across distributed storage systems, a mirrored storage environment may advantageously provide read-only load-balancing. However, one problem associated with mirrored storage environments is how to easily provide access to the writeable master storage volume for any client to update the data, yet still have the benefits of load-balanced read access from the read-only mirrored storage volumes. There remains a need, therefore, for an efficient and straightforward technique for specifically accessing a writeable master storage volume in a mirrored storage environment, particularly for both read and write access requests.

SUMMARY OF THE INVENTION

The present invention overcomes the disadvantages of the prior art by providing an administrative path for accessing a writeable master storage volume in a mirrored storage environment. Illustratively, a writeable master storage volume is maintained to store a master set of data addressable by a corresponding pathname for the data. Also, zero or more read-only mirrored storage volumes (e.g., load-balancing mirrors) are maintained for the master storage volume, the mirrored storage volumes configured to store a mirrored set of the master set of data, the mirrored set also addressable by the corresponding pathname. In particular, clients may read the data from either the master storage volume or one of the mirrored storage volumes (e.g., according to a configured access location, such as a local mirrored volume) by issuing read requests having the corresponding pathnames. Also, each client may specifically access the master set of data from the master storage volume by issuing an access (e.g., read or write) request having a specified master storage volume pathname prefix (e.g., "/.admin") prepended to the corresponding pathname of the data.

Illustratively, nodes of the storage environment in which the master and mirrored storage volumes are maintained may each be generally organized as a network element and/or a disk element, wherein the network element generally interfaces with a network and may be used to direct client requests to one or more disk elements, each of which generally interfaces with storage and communicates with (e.g., accesses) data in the storage (e.g., on one or more disks), such as the mirrored or master set of data. Each element includes a cluster fabric interface module adapted to implement a network protocol. In particular, in accordance with the present invention, a network element may receive an access request (e.g., a read request) without the novel master storage volume pathname prefix mentioned above, and may correspondingly direct the request to a local volume, e.g., a disk element maintaining a local mirror storage volume (if a mirror exists). Conversely, in response to receiving an access request (e.g., a read or write request) with the novel master prefix, the network element accordingly directs the request to the master storage volume, e.g., the disk element maintaining the master storage volume.

Advantageously, the novel technique provides an administrative path for accessing a writeable master storage volume in a mirrored storage environment. By directing all requests with a master storage volume pathname prefix to the writeable master storage volume, the novel technique ensures that the requests are directed to a proper storage volume, accordingly. In particular, by utilizing a master prefix, both read and write requests may be specifically directed to the master storage volume, while read requests not utilizing the master prefix may be directed to a local (e.g., mirrored) storage volume.

BRIEF DESCRIPTION OF THE DRAWINGS

The above and further advantages of invention may be better understood by referring to the following description in conjunction with the accompanying drawings in which like reference numerals indicate identical or functionally similar elements.

DETAILED DESCRIPTION OF ILLUSTRATIVE EMBODIMENTS

One or more embodiments of the present invention provide an administrative path for accessing a writeable master storage volume in a mirrored storage environment. By directing all access requests with a master storage volume pathname prefix to the writeable master storage volume, the novel techniques ensure that the requests are directed to a proper storage volume, accordingly. In particular, by utilizing a master prefix, both read and write requests may be specifically directed to the master storage volume, while read requests not utilizing the master prefix may be directed to a local (e.g., mirrored) storage volume.

A. Cluster Environment

Figure 1:
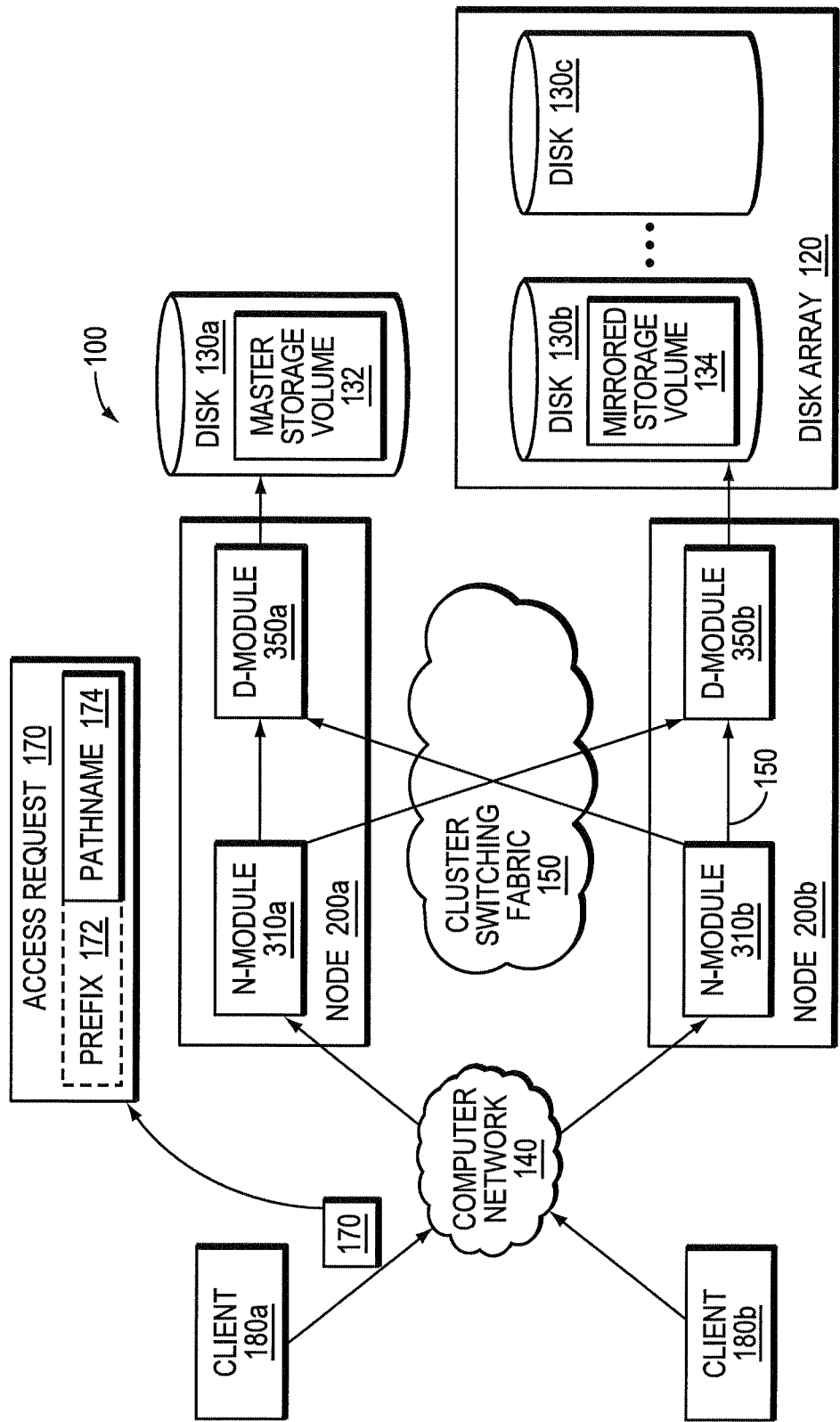
FIG. 1 is a schematic block diagram of a plurality of nodes interconnected as a cluster in accordance with an embodiment of the present invention.

FIG. 1 is a schematic block diagram of a plurality of nodes 200 (e.g., 200a and b) interconnected as a cluster 100 and configured to provide storage service relating to the organization of information on storage devices. The nodes 200 comprise various functional components that cooperate to provide a distributed storage system architecture of the cluster 100. To that end, each node 200 is generally organized as a network element (N-module 310a/310b) and a disk element (D-module 350a/350b). The N-module 310 includes functionality that enables the node 200 to connect to clients 180 (e.g., 180a and/or b) over a computer network 140, while each D-module 350 connects to one or more storage devices, such as disks 130 (e.g., 130a, b, and/or c) of a disk array 120. The nodes 200 are interconnected by a cluster switching fabric 150 which, in the illustrative embodiment, may be embodied as a Gigabit Ethernet switch. An exemplary distributed file system architecture is generally described in U.S. Pat. No. 6,671,773 titled METHOD AND SYSTEM FOR RESPONDING TO FILE SYSTEM REQUESTS, by M. Kazar et al. issued on Dec. 30, 2003. It should be noted that while there is shown an equal number of N and D-modules in the illustrative cluster 100, there may be differing numbers of N and/or D-modules in accordance with various embodiments of the present invention. For example, there may be a plurality of N-modules and/or D-modules interconnected in a cluster configuration 100 that does not reflect a one-to-one correspondence between the N and D-modules. As such, the description of a node 200 comprising one N-module and one D-module should be taken as illustrative only.

The clients 180 may be general-purpose computers configured to interact with the node 200 in accordance with a client/server model of information delivery. That is, each client may request the services of the node, and the node may return the results of the services requested by the client, by exchanging packets (e.g., access requests 170, described below) over the network 140. The client may issue packets including file-based access protocols, such as the Common Internet File System (CIFS) protocol or Network File System (NFS) protocol, over the Transmission Control Protocol/Internet Protocol (TCP/IP) when accessing information in the form of files and directories. Alternatively, the client may issue packets including block-based access protocols, such as the Small Computer Systems Interface (SCSI) protocol encapsulated over TCP (iSCSI) and SCSI encapsulated over Fibre Channel (FCP), when accessing information in the form of blocks.

B. Storage System Node

Figure 2:
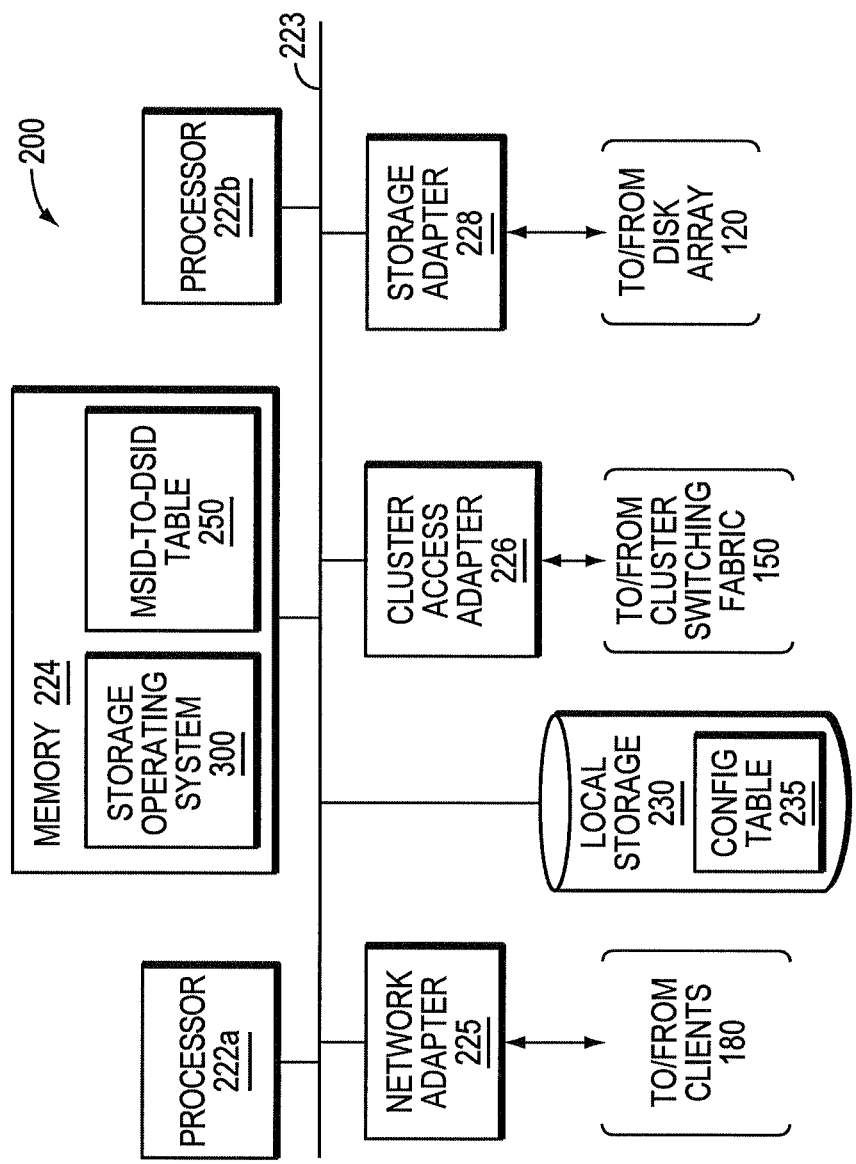
FIG. 2 is a schematic block diagram of a node in accordance with an embodiment of the present invention.

FIG. 2 is a schematic block diagram of a node 200 that is illustratively embodied as a storage system comprising a plurality of processors 222a,b, a memory 224, a network adapter 225, a cluster access adapter 226, a storage adapter 228, and local storage 230 interconnected by a system bus 223. The local storage 230 comprises one or more storage devices, such as disks, utilized by the node to locally store configuration information (e.g., in configuration table 235) provided by one or more management processes. The cluster access adapter 226 comprises a plurality of ports adapted to couple the node 200 to other nodes of the cluster 100. In the illustrative embodiment, Ethernet is used as the clustering protocol and interconnect media, although it will be apparent to those skilled in the art that other types of protocols and interconnects may be utilized within the cluster architecture described herein. In alternate embodiments where the N-modules and D-modules are implemented on separate storage systems or computers, the cluster access adapter 226 is utilized by the N/D-module for communicating with other N/D-modules in the cluster 100.

Each node 200 is illustratively embodied as a dual processor storage system executing a storage operating system 300 that preferably implements a high-level module, such as a file system, to logically organize the information as a hierarchical structure of named directories, files, and special types of files called virtual disks (hereinafter generally "blocks") on the disks. However, it will be apparent to those of ordinary skill in the art that the node 200 may alternatively comprise a single or more than two processor system. Illustratively, one processor 222a executes the functions of the N-module 310 on the node, while the other processor 222b executes the functions of the D-module 350.

The memory 224 illustratively comprises storage locations that are addressable by the processors and adapters for storing software program code and data structures associated with the present invention (e.g., MSID-to-DSID table 250, described herein). The processor and adapters may, in turn, comprise processing elements and/or logic circuitry configured to execute the software code and manipulate the data structures. The storage operating system 300, portions of which is typically resident in memory and executed by the processing elements, functionally organizes the node 200 by, inter alia, invoking storage operations in support of the storage service implemented by the node. It will be apparent to those skilled in the art that other processing and memory means, including various computer readable media, may be used for storing and executing program instructions pertaining to the invention described herein.

The network adapter 225 comprises a plurality of ports adapted to couple the node 200 to one or more users/clients 180 over point-to-point links, wide area networks, virtual private networks implemented over a public network (Internet) or a shared local area network. The network adapter 225 thus may comprise the mechanical, electrical, and signaling circuitry needed to connect the node to the network. Illustratively, the computer network 140 may be embodied as an Ethernet network or a Fibre Channel (FC) network. Each client 180 may communicate with the node over network 140 by exchanging discrete frames or packets of data according to pre-defined protocols, such as TCP/IP.

The storage adapter 228 cooperates with the storage operating system 300 executing on the node 200 to access information requested by the clients. The information may be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, the information is preferably stored on the disks 130 of array 120. The storage adapter comprises a plurality of ports having input/output (I/O) interface circuitry that couples to the disks over an I/O interconnect arrangement, such as a conventional high-performance, FC link topology.

Storage of information on each array 120 is preferably implemented as one or more storage "volumes" that comprise a collection of physical storage disks 130 cooperating to define an overall logical arrangement of volume block number (vbn) space on the volume(s). Each logical volume is generally, although not necessarily, associated with its own file system. The disks within a logical volume/file system are typically organized as one or more groups, wherein each group may be operated as a Redundant Array of Independent (or Inexpensive) Disks (RAID). Most RAID implementations, such as a RAID-4 level implementation, enhance the reliability/integrity of data storage through the redundant writing of data "stripes" across a given number of physical disks in the RAID group, and the appropriate storing of parity information with respect to the striped data. An illustrative example of a RAID implementation is a RAID-4 level implementation, although it should be understood that other types and levels of RAID implementations may be used in accordance with the inventive principles described herein.

In an exemplary embodiment, MSID-to-DSID table 250 may comprise one or more table entries having a master data set identifier (MSID) that indicates a volume family and a data set identifier (DSID) that uniquely identifies a particular instance of a volume of the volume family. In particular, the MSID identifies a volume family that may be identically replicated (e.g., mirrored) in the clustered storage system across a plurality of volumes, each particular volume identified by a corresponding DSID. The MSID-to-DSID table 250, therefore, provides a mapping for the storage system of where the particular volumes of a volume family are located. Notably, in the event of replicated/mirrored volumes, one particular DSID may represent the writeable "master" storage volume of the volume family, accordingly.

Also, contents of a volume location database (VLDB), which are illustratively stored in configuration table 235, may be used to map volume identifiers to a D-module 350 that "owns" (services/maintains) a data container (volume) within the clustered storage system 100. Thus, the VLDB is capable of tracking the locations of volumes (and aggregates) of nodes 200 within the clustered storage system. Illustratively, determining the location of a D-module 350 to which an N-module transmits a CF message (described below) is further described in commonly owned U.S. Pat. No. 7,743,210, entitled SYSTEM AND METHOD FOR IMPLEMENTING ATOMIC CROSS-STRIPE WRITE OPERATIONS IN A STRIPED VOLUME SET, filed by Richard P. Jernigan, IV et al. and issued on Jun. 22, 2010.

C. Storage Operating System

To facilitate access to the disks 130, the storage operating system 300 implements a write-anywhere file system that cooperates with one or more virtualization modules to "virtualize" the storage space provided by disks 130. The file system logically organizes the information as a hierarchical structure of named data containers, such as directories and files on the disks. Each "on-disk" file may be implemented as set of disk blocks configured to store information, such as data, whereas the directory may be implemented as a specially formatted file in which names and links to other files and directories are stored. The virtualization module(s) allow the file system to further logically organize information as a hierarchical structure of data containers, such as blocks on the disks that are exported as named logical unit numbers (luns).

In the illustrative embodiment, the storage operating system is preferably the NetApp® Data ONTAP™ operating system available from Network Appliance, Inc., Sunnyvale, Calif. that implements a Write Anywhere File Layout (WAFL™) file system. However, it is expressly contemplated that any appropriate storage operating system may be enhanced for use in accordance with the inventive principles described herein. As such, where the term "WAFL" is employed, it should be taken broadly to refer to any storage operating system that is otherwise adaptable to the teachings of this invention.

Figure 3:
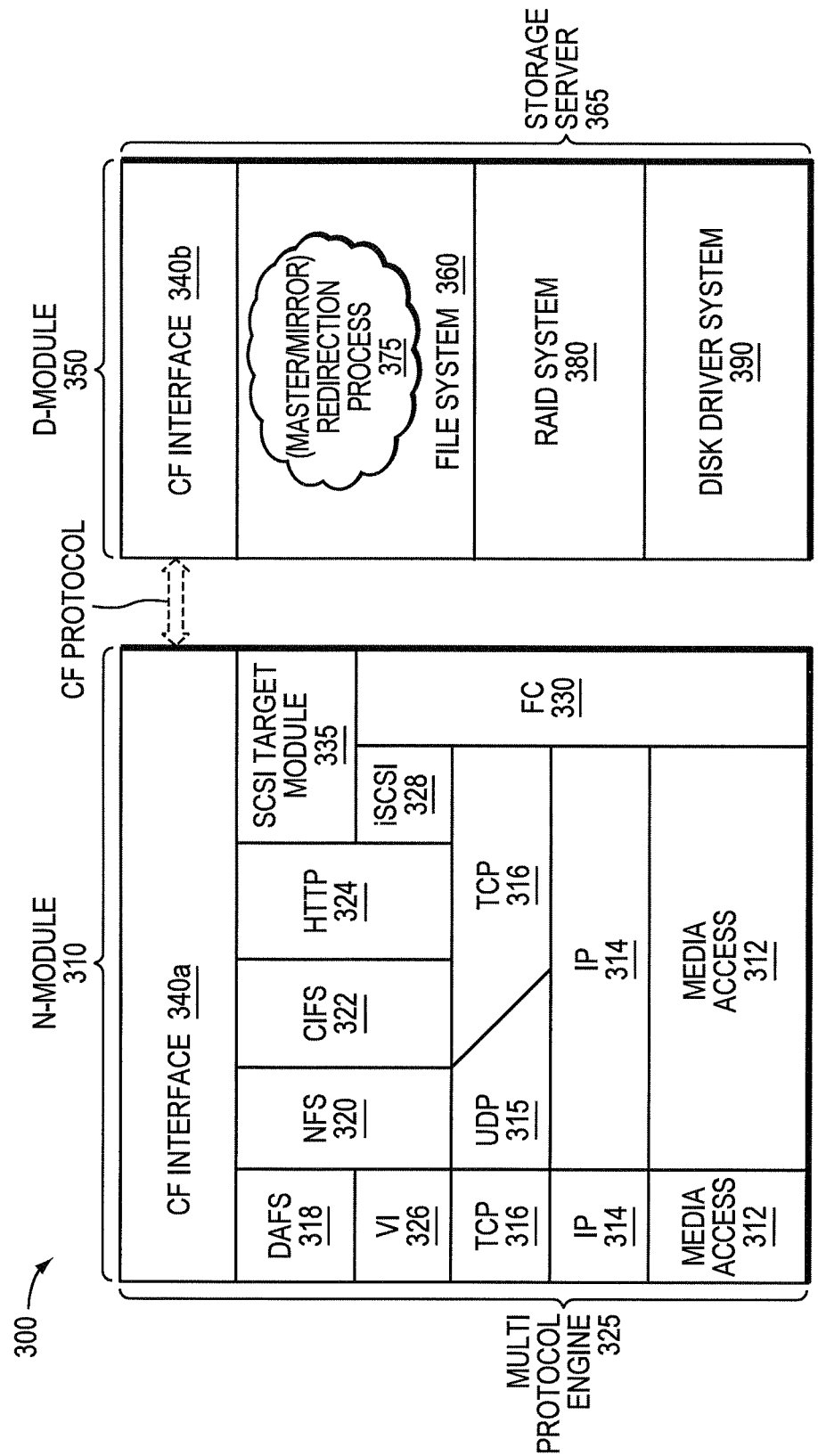
FIG. 3 is a schematic block diagram of a storage operating system that may be advantageously used with the present invention.

FIG. 3 is a schematic block diagram of the storage operating system 300 that may be advantageously used with the present invention. The storage operating system comprises a series of software layers organized to form an integrated network protocol stack or, more generally, a multi-protocol engine 325 that provides data paths for clients to access information stored on the node using block and file access protocols. The multi-protocol engine includes a media access layer 312 of network drivers (e.g., gigabit Ethernet drivers) that interfaces to network protocol layers, such as the IP layer 314 and its supporting transport mechanisms, the TCP layer 316, and the User Datagram Protocol (UDP) layer 315. A file system protocol layer provides multi-protocol file access and, to that end, includes support for the Direct Access File System (DAFS) protocol 318, the NFS protocol 320, the CIFS protocol 322, and the Hypertext Transfer Protocol (HTTP) protocol 324. A VI layer 326 implements the VI architecture to provide direct access transport (DAT) capabilities, such as RDMA, as required by the DAFS protocol 318. An iSCSI driver layer 328 provides block protocol access over the TCP/IP network protocol layers, while an FC driver layer 330 receives and transmits block access requests and responses to and from the node. The FC and iSCSI drivers provide FC-specific and iSCSI-specific access control to the blocks and, thus, manage exports of luns to either iSCSI or FCP or, alternatively, to both iSCSI and FCP when accessing the blocks on the node 200.

In addition, the storage operating system includes a series of software layers organized to form a storage server 365 that provides data paths for accessing information stored on the disks 130 of the node 200. To that end, the storage server 365 includes a file system module 360, a RAID system module 380, and a disk driver system module 390. The RAID system 380 manages the storage and retrieval of information to and from the volumes/disks in accordance with I/O operations, while the disk driver system 390 implements a disk access protocol such as, e.g., the SCSI protocol.

The file system 360 also implements processes, such as a redirection process 375, in an exemplary embodiment of the present invention. The redirection process 375 includes one or more computer-readable instructions that manage redirection of access requests to appropriate storage locations or volumes. For instance, within the clustered storage system 100 with multiple D-modules 350, multiple volumes may be associated with a single D-module, or multiple volumes may be allocated among multiple D-modules. For example, volumes distributed among multiple D-modules may be implemented with striped volumes of data, e.g. round-robin allocation of data among the striped volumes. Commonly-owned, U.S. Pat. No. 7,987,167 entitled ENABLING A CLUSTERED NAMESPACE WITH REDIRECTION, filed by Kazar et al. and issued on Jul. 26, 2011, the contents of which are hereby incorporated by reference as though fully set forth herein. In particular, as described herein, a volume family (e.g., identified by an MSID) may be distributed among a plurality of nodes 200 (and D-modules 350), such as in accordance with a mirrored storage environment. As such, redirection process 375 may be used to redirect access requests to particular volumes (e.g., identified by a DSID) within the volume family, accordingly.

Further, the file system 360 implements a virtualization system of the storage operating system 300 through the interaction with one or more virtualization modules illustratively embodied as, e.g., a virtual disk (vdisk) module (not shown) and a SCSI target module 335. The vdisk module enables access by administrative interfaces, such as a user interface of a management framework, in response to a user (system administrator) issuing commands to the node 200. The SCSI target module 335 is generally disposed between the FC and iSCSI drivers 328, 330 and the file system 360 to provide a translation layer of the virtualization system between the block (lun) space and the file system space, where luns are represented as files.

The file system 360 is illustratively a message-based system that provides logical volume management capabilities for use in access to the information stored on the storage devices, such as disks. That is, in addition to providing file system semantics, the file system 360 provides functions normally associated with a volume manager. These functions include (i) aggregation of the disks, (ii) aggregation of storage bandwidth of the disks, and (iii) reliability guarantees, such as mirroring and/or parity (RAID). The file system 360 illustratively implements the WAFL file system (hereinafter generally the "write-anywhere file system") having an on-disk format representation that is block-based using, e.g., 4 kilobyte (kB) blocks and using index nodes ("inodes") to identify files and file attributes (such as creation time, access permissions, size and block location). The file system uses files to store meta-data describing the layout of its file system; these meta-data files include, among others, an inode file. A file handle, i.e., an identifier that includes an inode number, is used to retrieve an inode from disk.

Broadly stated, all inodes of the write-anywhere file system are organized into the inode file. A file system (fs) info block specifies the layout of information in the file system and includes an inode of a file that includes all other inodes of the file system. Each logical volume (file system) has an fsinfo block that is preferably stored at a fixed location within, e.g., a RAID group. The inode of the inode file may directly reference (point to) data blocks of the inode file or may reference indirect blocks of the inode file that, in turn, reference data blocks of the inode file. Within each data block of the inode file are embedded inodes, each of which may reference indirect blocks that, in turn, reference data blocks of a file.

Operationally, a request from the client 180 is forwarded as a packet (e.g., access request 170) over the computer network 140 and onto the node 200 where it is received at the network adapter 225. A network driver (of layer 312 or layer 330) processes the packet and, if appropriate, passes it on to a network protocol and file access layer for additional processing prior to forwarding to the write-anywhere file system 360. Upon receiving the request 170 (packet), the file system 360 generates operations to access the requested data (e.g., identified by a pathname 174, described herein) from disk 130 if it is not resident "in core", i.e., in memory 224. If the information is not in memory, the file system 360 indexes into the inode file using the inode number to access an appropriate entry and retrieve a logical vbn. The file system then passes a message structure including the logical vbn to the RAID system 380; the logical vbn is mapped to a disk identifier and disk block number (disk,dbn) and sent to an appropriate driver (e.g., SCSI) of the disk driver system 390. The disk driver accesses the dbn from the specified disk 130 and loads the requested data block(s) in memory for processing by the node. Upon completion of the request, the node (and operating system) returns a reply to the client 180 over the network 140.

It should be noted that the software "path" through the storage operating system layers described above needed to perform data storage access for the client request received at the node may alternatively be implemented in hardware. That is, in an alternate embodiment of the invention, a storage access request data path may be implemented as logic circuitry embodied within a field programmable gate array (FPGA) or an application specific integrated circuit (ASIC). This type of hardware implementation increases the performance of the storage service provided by node 200 in response to a request issued by client 180. Moreover, in another alternate embodiment of the invention, the processing elements of adapters 225, 228 may be configured to offload some or all of the packet processing and storage access operations, respectively, from processor 222, to thereby increase the performance of the storage service provided by the node. It is expressly contemplated that the various processes, architectures, and procedures described herein can be implemented in hardware, firmware, or software.

As used herein, the term "storage operating system" generally refers to the computer-executable code operable on a computer to perform a storage function that manages data access and may, in the case of a node 200, implement data access semantics of a general purpose operating system. The storage operating system can also be implemented as a microkernel, an application program operating over a general-purpose operating system, such as UNIX® or Windows NT®, or as a general-purpose operating system with configurable functionality, which is configured for storage applications as described herein.

In addition, it will be understood to those skilled in the art that the invention described herein may apply to any type of special-purpose (e.g., file server, filer or storage serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network, and a disk assembly directly-attached to a client or host computer. The term "storage system" should therefore be taken broadly to include such arrangements in addition to any subsystems configured to perform a storage function and associated with other equipment or systems. It should be noted that while this description is written in terms of a write any where file system, the teachings of the present invention may be utilized with any suitable file system, including a write in place file system.

D. CF Protocol

In the illustrative embodiment, the storage server 365 is embodied as D-module 350 of the storage operating system 300 to service one or more volumes of array 120. In addition, the multi-protocol engine 325 is embodied as N-module 310 to (i) perform protocol termination with respect to a client issuing incoming data access request packets over the network 140, as well as (ii) redirect those data access requests to any storage server 365 of the cluster 100. Moreover, the N-module 310 and D-module 350 cooperate to provide a highly-scalable, distributed storage system architecture of the cluster 100. To that end, each module includes a cluster fabric (CF) interface module 340a,b adapted to implement intra-cluster communication among the modules, including D-module-to-D-module communication for, e.g., data container striping operations.

The protocol layers, e.g., the NFS/CIFS layers and the iSCSI/FC layers, of the N-module 310 function as protocol servers that translate file-based and block based data access requests from clients into CF protocol messages used for communication with the D-module 350. That is, the N-module servers convert the incoming data access requests into file system primitive operations (commands) that are embedded within CF messages by the CF interface module 340 for transmission to the D-modules 350 of the cluster 100. Notably, the CF interface modules 340 cooperate to provide a single file system image across all D-modules 350 in the cluster 100. Thus, any network port of an N-module that receives a client request can access any data container within the single file system image located on any D-module 350 of the cluster.

Further to the illustrative embodiment, the N-module 310 and D-module 350 are implemented as separately-scheduled processes of storage operating system 300; however, in an alternate embodiment, the modules may be implemented as pieces of code within a single operating system process. Communication between an N-module and D-module is thus illustratively effected through the use of message passing between the modules although, in the case of remote communication between an N-module and D-module of different nodes, such message passing occurs over the cluster switching fabric 150. A known message-passing mechanism provided by the storage operating system to transfer information between modules (processes) is the Inter Process Communication (IPC) mechanism.

The protocol used with the IPC mechanism is illustratively a generic file and/or block-based "agnostic" CF protocol that comprises a collection of methods/functions constituting a CF application programming interface (API). Examples of such an agnostic protocol are the SpinFS and SpinNP protocols available from Network Appliance, Inc. The SpinFS protocol is described in the above-referenced U.S. Pat. No. 6,671,773. To that end, the CF protocol is illustratively a multi-layered network protocol that integrates a session infrastructure and an application operation set into a session layer. The session layer manages the establishment and termination of sessions between modules in the cluster and is illustratively built upon a connection layer that defines a set of functionality or services provided by a connection-oriented protocol. The connection-oriented protocol may include a framing protocol layer over a network transport, such as TCP or other reliable connection protocols, or a memory-based IPC protocol. An example of a session layer that may be advantageously used with the present invention is described in commonly owned, U.S. Pat. No. 7,443,872 entitled SYSTEM AND METHOD FOR MULTIPLEXING CHANNELS OVER MULTIPLE CONNECTIONS IN A STORAGE SYSTEM CLUSTER, filed by Peter F. Corbett et al. and issued on Oct. 28, 2008, the contents of which are hereby incorporated in their entirety as though fully set forth herein.

The CF interface module 340 implements the CF protocol for communicating file system commands among the modules of cluster 100. Communication is illustratively effected by the D-module exposing the CF API to which an N-module (or another D-module) issues calls. To that end, the CF interface module 340 is organized as a CF encoder and CF decoder. The CF encoder of, e.g., CF interface 340a on N-module 310 encapsulates a CF message as (i) a local procedure call (LPC) when communicating a file system command to a D-module 350 residing on the same node 200 or (ii) a remote procedure call (RPC) when communicating the command to a D-module residing on a remote node of the cluster 100. In either case, the CF decoder of CF interface 340b on D-module 350 de-encapsulates the CF message and processes the file system command.

E. Mirrored Storage Environment

As noted above, mirrors may be used for improved reliability as well as for load balancing data access requests. In particular, a distributed storage system environment (e.g., a cluster 100) may provide access to a data set (e.g., a volume) for a large number of clients 180. As such, the large number of corresponding access requests for that data set may become a bottleneck, where generally one particular storage system maintaining the data set must service each of the requests. By providing read-only load-balancing mirrors of the data set stored on each storage system of the distributed storage system environment, a load-balancing mirrored storage environment may be established. In particular, a data set that is accessed often, yet that is not modified often (e.g., the root volume), is a good candidate for mirroring. In this manner, any read-only access request from a client for the mirrored data set (e.g., the root volume) may be serviced from any storage system having a mirrored copy, thus alleviating the bottleneck at the storage system maintaining the original version of the mirrored data set (the "master" data set or volume).

Illustratively, a writeable master storage volume 132 may be maintained (e.g., by node 200a) to store a master set of data addressable by a corresponding pathname. For example, data corresponding to a file named "data.txt" may be organized within a subdirectory "/bar" of directory "/foo", thus at a location in the master storage volume having a corresponding pathname of "/foo/bar/data.txt", accordingly. Also, in accordance with one or more embodiments of the present invention, zero or more read-only mirrored storage volumes (e.g., load-balancing mirrors) are maintained for the master storage volume. For instance, one example mirrored storage volume 134 may be maintained by node 200b. Each mirrored storage volume is correspondingly configured to store a mirrored set of the master set of data, the mirrored set also addressable by the corresponding pathname. In other words, the file located at "/foo/bar/data.txt" of the master storage volume 132 may also be found at "/foo/bar/data.txt" of the mirrored storage volume(s) 134. In addition, should data of the master data set at the master storage volume be modified/updated, the mirrored data set of the mirrored storage volume(s) may also be updated (e.g., replicating the master set to the mirrored sets).

One common form of establishing/updating mirrors involves the use of a "snapshot" process in which the content of the master storage volume is captured and transmitted over a network to one or more mirrored storage volumes. Note that the term "snapshot" is a trademark of Network Appliance, Inc. It is used for purposes of this patent to designate a persistent consistency point image (PCPI). A persistent consistency point image is a point in time representation of the storage system, and more particularly, of the master storage volume, stored on a storage device or in other persistent memory and having a name or other unique identifier that distinguishes it from other PCPIs taken at other points in time. A PCPI can also include other information (metadata) about the active file system at the particular point in time for which the image is taken. The terms PCPI and snapshot may be used interchangeably through out this patent without derogation of Network Appliance's is trademark rights. The PCPI process is described in further detail in U.S. Pat. No. 4,454,445, entitled INSTANT SNAPSHOT by Blake Lewis et al. and issued on Nov. 18, 2008, TR3002File System Design for an NFS File Server Appliance by David Hitz et al., published by Network Appliance, Inc., and in U.S. Pat. No. 5,819,292 entitled METHOD FOR MAINTAINING CONSISTENT STATES OF A FILE SYSTEM AND FOR CREATING USER-ACCESSIBLE READ-ONLY COPIES OF A FILE SYSTEM by David Hitz et al., which are hereby incorporated by reference.

An exemplary PCPI-based mirroring technique (e.g., a "SnapMirror" generation technique) typically provides for remote asynchronous replication or mirroring of changes made to a source file system PCPI (e.g., of the master storage volume) in a destination replica file system (e.g., a mirrored storage volume). The mirroring technique typically scans (via a scanner) the blocks that make up two versions of a PCPI of the source file system, to identify latent divergence, i.e., changed blocks in the respective PCPI files based upon differences in vbns further identified in a scan of a logical file block index of each PCPI. Trees (e.g., buffer trees) of blocks associated with the files are traversed, bypassing unchanged pointers between versions, to identify the changes in the hierarchy of the trees. These changes are transmitted to the destination replica (mirror). This technique allows regular files, directories, inodes, and any other hierarchical structure of trees to be efficiently scanned to determine differences (latent divergence) between versions thereof. A set number of PCPIs may be retained both on the source and the destination depending upon various time-based and other criteria.

Illustratively, in accordance with one or more embodiments of the present invention, nodes 200 of the storage environment in which the master and mirrored storage volumes are maintained (e.g., cluster 100) may each be generally organized as a network element 310 and/or a disk element 350, wherein the network element generally interfaces with a network 140 and may be used to direct client access requests 170 to one or more disk elements. Each disk element 350 generally interfaces with storage and communicates with (e.g., accesses) data in the storage (e.g., on one or more disks), such as the master set of data (master storage volume 132) and zero or more mirrored sets of data (mirrored storage volume 134). For example, node 200a comprises network element 310a and disk element 350a, which maintains disks 130 containing the master storage volume 132. Also, node 200b comprises a network element 310b and disk element 350b, which maintains disks 130 containing an illustrative mirrored storage volume 134. Notably, while each of the master and mirrored storage volumes are illustratively shown as being maintained within a single disk 130, those skilled in the art will appreciate that storage volumes may be distributed among a plurality of disks 130, such as disks of an array 120 or as disks maintained by different nodes 200. Accordingly, the location of the master and mirrored storage volumes and references thereto as used herein are merely representative examples, and are not meant to be limiting on the scope of the present invention.

Notably, by having read-only load-balancing mirrors of a particular data set (e.g., of a root volume) on each disk element 350 in the mirrored storage environment (e.g., in the namespace container), any read-only external client access requests 170 (e.g., for CIFS, NFS, etc.) that access the particular data set (e.g., the root volume) may be serviced from any disk element. Since external client requests illustratively arrive at network elements 310, and since each network element has a "local" disk element 350 on the same node 200, the external request 170 can be serviced locally, rather than being serviced by a disk element 350 that is likely to be on another node. In this manner, a potential bottleneck associated with having data available on only one storage volume (e.g., from one disk element) may be avoided.

As used herein, a "namespace" is a collection of files and pathnames to the files, while a "global namespace" is the collection of clients 180 and clusters 100 sharing the namespace. Also, the set of volumes maintained by load-balancing mirrors and the writeable master volume (i.e., in a mirrored storage environment of a corresponding global namespace) is collectively referred to as a "volume family". Each volume of a volume family shares the same MSID, but to distinguish among the set of volumes, each volume also has its own unique DSID. In this manner, access requests may be directed to any available load-balancing mirror for an MSID that appears in the request's filehandle (not shown), as will be appreciated by those skilled in the art. For instance, a client (e.g., 180) may request data from a volume family having an MSID, and the receiving node 200 (e.g., network element/N-module 310) may redirect the request to an appropriate (e.g., local) volume using a corresponding DSID, accordingly.

As noted, by creating multiple read-only replicas of portions of a data set and/or volume across distributed storage systems, a mirrored storage environment may advantageously provide read-only load-balancing (e.g., reading from a local PCPI). In particular, however, one problem associated with mirrored storage environments is how to easily provide access to the writeable master storage volume for any client to update the data, yet still have the benefits of load-balanced read access from the read-only mirrored storage volumes. For instance, if a network element 310 receiving a request for a data (of a particular MSID) is configured to select a configurable (e.g., local) disk element 350 (corresponding to a selected DSID) to load-balance access to the data, a technique is needed that may specifically indicate whether the writeable master version of the data is requested, or if a read-only mirrored version may be used.

F. Access Path to Writeable Master Storage Volume

The present invention provides a path (e.g., an administrative path) for accessing a writeable master storage volume in a mirrored storage environment. In particular, clients may read the data from either the master storage volume or one of the mirrored storage volumes (e.g., according to a configured access location, such as a local mirrored volume if one exists) by issuing read requests having the corresponding pathnames for the data. Also, each client may specifically access the master set of data from the master storage volume by issuing an access (e.g., read or write) request having a specified master storage volume pathname prefix (e.g., "/.admin") prepended to the corresponding pathname of the data.

In particular, a specified master storage volume pathname prefix (a "master prefix") may be provided, such that if a pathname 174 (an access path) of an access request 170 from a client 180 comprises the master prefix (e.g., "/.admin") 172, then the writeable master storage volume 132 is always accessed. In particular, the master storage volume 132 is accessed regardless as to whether there are any load-balancing mirrored storage volumes 134 for the volume family. Notably, the specified master storage volume pathname prefix 172 is not a portion of a path to reach the data corresponding to the pathname 174, but is rather an indication to access the master storage volume 132. That is, there is no directory named by the master prefix (e.g., no "/.admin" directory) in the file system. The master prefix 172 simply indicates to a receiving storage system (node 200) that the writeable version of the data is to be accessed. (Those skilled in the art will appreciate an example meaning/significance of the characters "/", ".", and ".." where applicable. For example, "." may be a reference to a current directory, while "/." implies a prefix to a filename that has special visibility properties in the directory. Also, ".." is a reference to a parent directory, as will be understood.)

Illustratively, however, the master prefix may be treated as a directory in certain respects. For example, where an illustrative client file system operates in accordance with NFS (mentioned above and as will be understood by those skilled in the art), mount operations may see the master prefix directory ("/.admin"), while file and lock operations do not. Thus, if a client 180 (e.g., an NFS client) mounts the root directory ("/"), then tries to change directories to the master prefix directory, or view the contents of the root directory, the lookup to the master prefix directory will fail. However, if the client mounts a pathname starting with the master prefix (e.g., "/.admin"), then all access from that pathname (e.g., all volumes below /.admin) is to the writeable master storage volume 132 for the volume family.

Operationally, a client 180 (e.g., a user and/or client process/application) may determine a need to generate an access request for data that is stored on a configured one of either the master storage volume or one of the mirrored storage volumes. In other words, the client may wish to read data that is mirrored from the master storage volume 132 onto one or more mirrored storage volumes 134. Accordingly, as described above, for load-balancing purposes, the client 180 may transmit (send) a read request 170 to a configured one of either the master storage volume or one of the mirrored storage volumes (e.g., to a local N-module 310 of a local node 200). The read request illustratively comprises a pathname 174 corresponding to the data of the read request (without the prepended specified master storage volume pathname prefix 172). For example, client 180b may wish to read data located at a pathname 174 of "/foo/bar/data.txt", that is, a file named "data.txt" located at a subdirectory "/bar" of a parent directory "/foo".

In particular, in accordance with the present invention, a network element (e.g., N-module 310b) may receive the read request 170 without the novel master storage volume pathname prefix, and may correspondingly direct the request to a local volume, e.g., disk element 350b maintaining a local mirror storage volume 134 (if one exists). For instance, if the disk element 350b maintains a mirrored copy of the requested data, in accordance with load-balancing mirrors, the receiving network element 310b may transmit the read request 170 to the disk element 350b of the same node (storage system) 200. Alternatively, if the disk element 350b does not maintain a mirrored copy of the data, the network element 310b may forward the request to an appropriate disk element 350 (e.g., with redirection process 375 and through cluster switching fabric 150) that does maintain a copy (e.g., a mirrored storage volume on another node or the master storage volume).

Notably, the network elements 310 may be configured to always direct the requests to a mirrored storage volume 134 (i.e., where at least one mirrored storage volume exists), such that the master storage volume never services read requests.

In this manner, without using the specified master storage volume pathname prefix 172 with the pathname 174 (i.e., using a conventional pathname), a client 180 is directed to a read-only version/copy of the requested data.

Conversely, a client 180 may determine a need to generate an access request (e.g., read and/or write) for the data, particularly for the master set of the data of the master storage volume 132. For example, a client (e.g., an administrator or other user) may wish to update a master copy of the data, such as updating the file "data.txt" located at a pathname of "/foo/bar/data.txt", as mentioned above. Accordingly, the client (e.g., 180b) may transmit (send) the access (e.g., write) request 170 to the master storage volume 132 with the specified master storage volume pathname prefix 172 (e.g., "/.admin") prepended to a pathname 174 corresponding to the data of the access request (e.g., "data.txt"), e.g., "/.admin/foo/bar/data.txt".

In particular, in response to receiving the access request 170 with the novel master prefix 172, a network element (e.g., redirection process 375 of N-module 310b) accordingly directs the request to the master storage volume 132, that is, to the disk element (e.g., D-module 350a) maintaining the master storage volume 132 (e.g., on disk 130a). The corresponding disk element may then access the master set of data from the master storage volume 132 for the data located at the pathname 172, e.g., "/foo/bar/data.txt", and may perform the access operation, e.g., write the data.

Notably, once data is written to the master storage volume 132, the mirrored storage volumes 134 containing that data are out-of-date until subsequently updated (e.g., as described above). Accordingly, in order to access the newly written data at the master storage volume 132, the client continues to access the data from the master set of the master storage volume with read requests 170 having the prepended prefix 172 until the master set of the master storage volume has been replicated onto the one or more mirrored storage volumes 134 of the mirrored set. In other words, in addition to writing to the writeable master storage volume 132, read requests 170 may need to be sent to the master storage volume with the master prefix 172, for instance, until the master data set is replicated to the mirrors, thus allowing load-balancing to resume.

Figure 4:
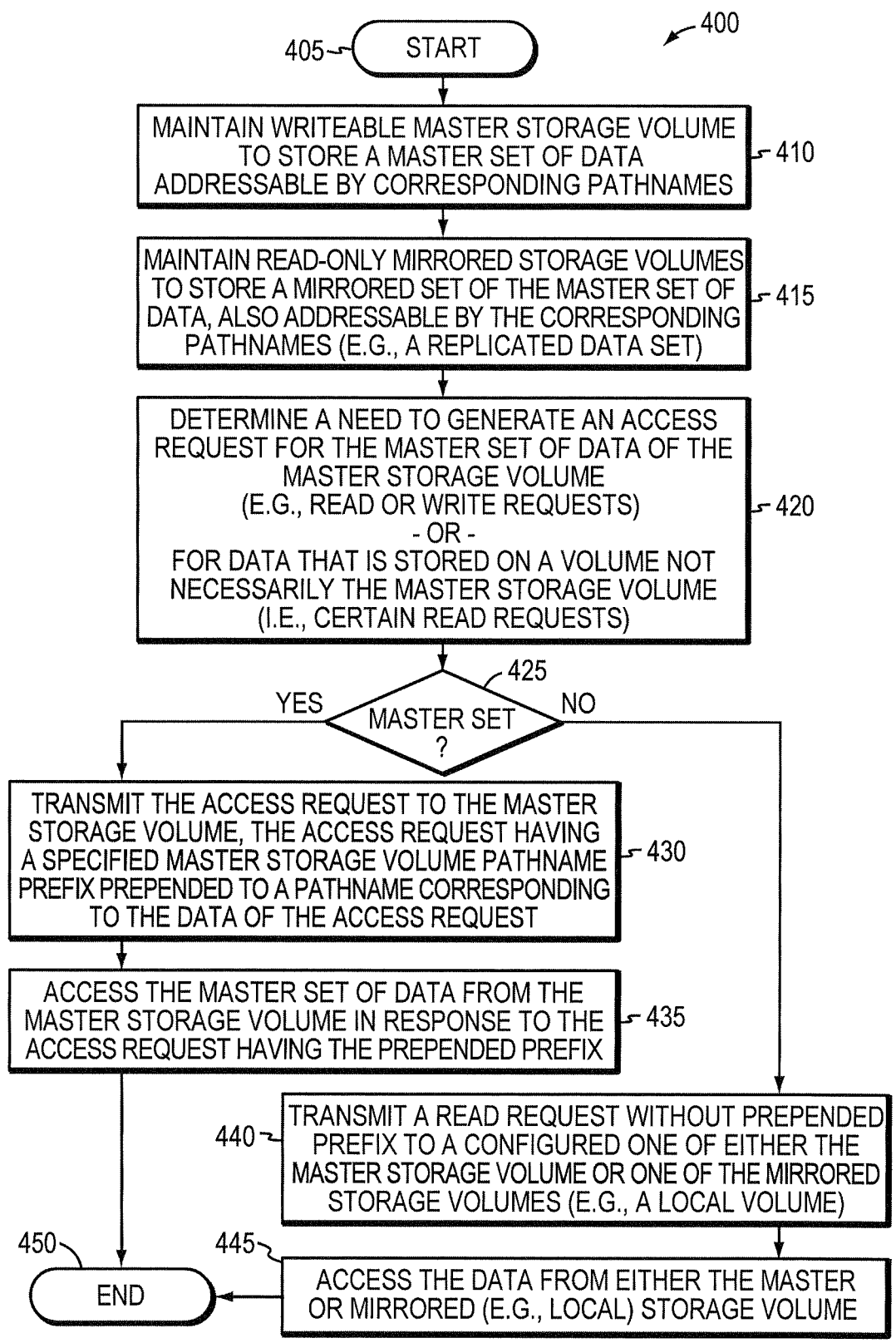
FIG. 4 is a flowchart detailing the steps of a procedure for providing an administrative path for accessing a writeable master storage volume in a mirrored storage environment in accordance with one or more embodiments of the present invention.

FIG. 4 is a flowchart detailing the steps of a procedure 700 for providing an administrative path for accessing a writeable master storage volume in a mirrored storage environment in accordance with one or more embodiments of the present invention. The procedure starts in step 405 and proceeds to step 410 where a writeable master storage volume (e.g., 132) is maintained (e.g., by nodes 200) to store a master set of data addressable by corresponding pathnames. Also, in step 415, zero or more read-only mirrored storage volumes (e.g., 134) may be maintained (e.g., by nodes 200) to store a mirrored set of the master set of data, also addressable by the corresponding pathnames (e.g., a replicated data set), as described in more detail above.

In step 420, a client (e.g., 180b) determines a need to generate an access request for the master set of data of the master storage volume 132 (e.g., a read or write request for data) or, alternatively, for data that is stored on a volume not necessarily the master storage volume (i.e., certain read requests). If the access request is for the master set in step 425, then the client may transmit the access request 170 to the master storage volume in step 430, the access request having a specified master storage volume pathname prefix 172 prepended to a pathname 174 corresponding to the data of the access request (e.g., "/.admin/foo/bar/data.txt"). In response to receiving the access request having the preprended prefix 172, a corresponding node 200 accesses the master set of data from the master storage volume in step 435 to access (e.g., read or write) the data (e.g., to read or write "/foo/bar/data.txt" of the master storage volume). For instance, as described above, depending upon the particular receiving node 200 (e.g., a particular receiving N-module 310), the redirection process 375 of the corresponding D-module 350 determines the location of the master storage volume, and may redirect the request to the appropriate node 200 (i.e., if the corresponding D-module does not maintain the master storage volume itself).

If, on the other hand, the access request is not necessarily for the master set in step 425 (i.e., is a read request), then the client may transmit the read request 170 without the prepended prefix 172 to a configured one of either the master storage volume or one of the mirrored storage volumes (e.g., a local volume) in step 440 (e.g., simply having the pathname 174, such as "/foo/bar/data.txt"). In response to receiving the read (access) request having no prepended prefix 172, a corresponding node 200 accesses the configured (e.g., local) set of data from either the master storage volume 132 or mirrored storage volume 134 in step 445 to access (i.e., read) the data. For instance, as also described above, depending upon the particular receiving node 200 (e.g., a particular receiving N-module 310), the redirection process 375 of the corresponding D-module 350 determines the location of a locally configured volume that stores the requested data, such as a local mirrored storage volume (or the master storage volume, if local and so configured). Accordingly, if a local volume is maintained by the corresponding D-module 350, the corresponding D-module may handle the request itself with its locally attached volume (e.g., disks 130, which may contain either a mirrored or master data set). If a local volume is not maintained, then redirection process 375 of the corresponding D-module redirects the request to an appropriate configured node 200, as described above. The procedure 400 ends in step 445, notably with the option of additional access requests and further maintenance of the master and mirrored volumes accordingly.

Advantageously, the novel technique provides an administrative path for accessing a writeable master storage volume in a mirrored storage environment. By directing all requests with a master storage volume pathname prefix to the writeable master storage volume, the novel technique ensures that the requests are directed to a proper storage volume, accordingly. In particular, by utilizing a master prefix, both read and write requests may be specifically directed to the master storage volume, while read requests not utilizing the master prefix may be directed to a local (e.g., mirrored) storage volume. In other words, the novel technique provides a simple, consistent manner to always locate and address the writeable master version of data (e.g., of a file) which may or may not have a load-balanced (read-only) mirror replica.

While there have been shown and described illustrative embodiments that provide an administrative path for accessing a writeable master storage volume in a mirrored storage environment, it is to be understood that various other adaptations and modifications may be made within the spirit and scope of the present invention. For example, the embodiments have been shown and described herein with/using clustered storage systems, particularly network elements and disk elements and the associated cluster interface. However, the embodiments of the invention in its broader sense are not so limited, and may, in fact, be used with any devices/nodes that may redirect access requests between master and mirrored storage volumes in a similarly applicable manner, as will be understood by those skilled in the art. Also, any volume (data set) may have a load-balancing mirrored data set, such as a first mirrored set of the master set of data being mirrored as a second data set by a second mirrored storage volume (with corresponding pathnames). As such, when locally accessing the second data set with a master storage volume pathname prefix prepended to the request, the writeable master storage volume is accessed, thus bypassing the first (e.g., read-only) mirrored set.

Further, in accordance with an alternative embodiment of the present invention, the master prefix 172 may be dynamically prepended to all write requests 170 for a mirrored storage environment, thus directing all write requests to the writeable master volume 132. However, one problem associated with this alternative embodiment is that it would be difficult to correspondingly dynamically read from the master storage volume 132 as necessary. For instance, a network element 310 transmitting a write request 170 to the master storage volume may determine (e.g., through a session protocol) that subsequent reads for the written data should be sent to the same volume location, i.e., to the master storage volume. If all network elements write data to the master storage volume at some point, however, then all network elements may direct read requests to the master storage volume, thus nullifying the purpose of the load-balancing mirrored storage environment. Conversely, in the event that the network element that sent the write request to the master storage volume fails, then the client utilizing that failed network element may be redirected to a new network element (e.g., through network 140). That new network element, however, may be unaware of the previously written data at the master storage volume 132, and may direct any read requests to a local mirrored storage volume 134 accordingly. In response to these (and other) concerns, the alternative embodiment for dynamically sending write requests to the master storage volume may still particularly benefit from specifically prepending the master prefix 172 to pathnames 174 of read requests 170 that are meant to be directed to the master storage volume, as described above.

In addition, according to one or more embodiments of the present invention, other illustrative features may be available in accordance with providing an administrative path for accessing a writeable master storage volume in a mirrored storage environment as described above. For example, the ".admin" (prefix) space may be a virtual extension of the namespace, such that the ".admin" prefix may appear everywhere in any directory (e.g., is omnipresent). The ".admin" path component, thus, may appear anywhere in a pathname, not just as a prefix (thus, "prepending" is also illustrative). Also, access to the writeable copy (the ".admin" pathname) may be limited by enforcing mount options, as may be appreciated by those skilled in the art, such that a client with write access to the data may be allowed to enter the writeable master copy, while a client without write access may not. Further, particular levels of the pathname may be restricted to certain clients, e.g., clients with write access to mount the top level writeable directory (e.g., to those with root access), and other clients with write access to mount only certain writeable directories. In particular, it is not necessary that writeable directories be available for each directory pathname. In other words, the prepended prefix (".admin") provides a gateway to the writeable master data, and the number of gateways to the roots of the namespace or to volume roots, for example, may be limited.

Moreover, in accordance with one or more embodiments of the present invention, it may be beneficial to monitor (keep track of) whether a client is in the writeable (.admin) copy or the normal (e.g., local/configured) namespace, e.g., such as by marking a flag in the filehandles that are given to the client. In this manner, when the client subsequently changes directories through a namespace, this flag may be used to remember that the client has access to the writeable (.admin) copy of the data. (Note that the filehandle is generally opaque to the clients, thus the presence or absence of the flag may be obscure to the client, if so configured.) By tracking whether a client is in the writeable namespace allows for the construction of complex namespaces from volumes that are mirrored, junctioned to volumes that are not mirrored, junctioned again to other mirrored volumes, in any combination. That is, as the client traverses the namespace, the namespace may be moved to either read-only mirrors or writable master volumes according to whether the client has entered the writeable (.admin) namespace at some higher level directory. Also, in one or more embodiments, it may be beneficial to configure the transition to the writeable (.admin) namespace to occur only once. In other words, once in the .admin namespace, changing directories again to a writeable (.admin) directory is idempotent, and the .admin namespace remains the active namespace once it has been entered. Further, changing directories to the parent directory (e.g., to "..") may lead to a different parent directory depending on whether the client is in the writeable (.admin) namespace or not.

The foregoing description has been directed to particular embodiments of this invention. It will be apparent, however, that other variations and modifications may be made to the described embodiments, with the attainment of some or all of their advantages. Specifically, it should be noted that the principles of the present invention may be implemented in non-distributed file systems. Furthermore, while this description has been written in terms of N and D-modules (network elements and disk elements), the teachings of the present invention are equally suitable to systems where the functionality of the N and D-modules are implemented in a single system. Alternately, the functions of the N and D-modules may be distributed among any number of separate systems, wherein each system performs one or more of the functions. Additionally, the procedures, processes, and/or modules described herein may be implemented in hardware, software, embodied as a computer-readable medium having program instructions, firmware, or a combination thereof. Therefore, it is the object of the appended claims to cover all such variations and modifications as come within the true spirit and scope of the invention.

What is claimed is:

1. A method for providing an administrative path for accessing a writeable master storage volume in a mirrored storage environment, the method comprising:

maintaining the writeable master storage volume to store a master set of data addressable by a corresponding pathname;

maintaining zero or more read-only mirrored storage volumes for the writeable master storage volume, each mirrored storage volume configured to store a mirrored set of the master set of data, the mirrored set also addressable by the corresponding pathname;

accessing first data from a configured one of either the writeable master storage volume or one of the mirrored storage volumes utilizing the corresponding pathname, in response to a first read request having the corresponding pathname; and accessing the master set of data from the writeable master storage volume utilizing a specified master storage volume pathname prefix, in response to an access request having the specified master storage volume pathname prefix prepended to the corresponding pathname.

2. The method as in claim 1, wherein the configured one of either the writeable master storage volume or one of the mirrored storage volumes is a local storage volume to a client originating the read request.

3. The method as in claim 2, wherein the local storage volume is one of the mirrored storage volumes.

4. The method as in claim 1, wherein the zero or more mirrored storage volumes are load-balancing mirrors of the writeable master storage volume.

5. The method as in claim 1, wherein the access request is one of either a read request or a write request.

6. The method as in claim 1, further comprising:
writing second data of the access request to the master set of the writeable master storage volume; and
accessing the second data, of the access request and written to the master set of data, from the writeable master storage volume with a second read request having the prepended specified master storage volume pathname prefix until the master set of data of the writeable master storage volume has been replicated onto the mirrored set of the one or more mirrored storage volumes.

7. The method as in claim 6, further comprising:
replicating the master set of data of the writeable master storage volume onto the mirror set of one or more mirrored storage volumes; and
accessing the master set of data of the writeable master storage volume from the mirrored set of data of the one or more mirrored storage volumes with a third read request without the prepended specified master storage volume pathname prefix.

8. The method as in claim 7, wherein replicating further comprises:
generating a presistent consistency point image (PCPI) of the master set of data of the writeable master storage volume on the one or more mirrored storage volumes as the mirrored set, wherein the PCPI is a Snap Mirror.

9. The method as in claim 1, wherein the specified master storage volume pathname prefix is an indication to access the writeable master storage volume.

10. The method as in claim 9, wherein the specified master storage volume pathname prefix is not a portion of a path to reach the first data corresponding to the pathname.

11. The method as in claim 1, wherein the mirrored storage volumes are configured to store a second mirrored set of a first mirrored set of the master set of data, the second mirrored set also addressable by the same corresponding pathname.

12. The method as in claim 1, further comprising:
accessing the first data from one or more storage systems, each storage system having a network element and a disk element, one of the disk elements configured to maintain the writeable master storage volume, and one or more of the disk elements configured to maintain a corresponding one of one or more mirrored storage volumes.

13. The method as in claim 1, wherein the specified master storage volume pathname prefix is "/.admin".

14. A system for use with providing an administrative path for accessing a writeable master storage volume in a mirrored storage environment, the system comprising:
the writeable master storage volume to store a master set of data addressable by a corresponding pathname;
zero or more read-only mirrored storage volumes for the writeable master storage volume, each mirrored storage volume configured to store a mirrored set of the master set of data, the mirrored set also addressable by the corresponding pathname; and
one or more storage systems configured to access data from a configured one of either the master storage volume or the mirrored storage volumes utilizing the corresponding pathname in response to a first read request having the corresponding pathname, and to access the master set of data from the writeable master storage volume utilizing a specified master storage volume pathname prefix in response to an access request having the specified master storage volume pathname prefix prepended to the corresponding pathname.

15. The system as in claim 14, wherein the one or more storage systems each further comprise a network element and a disk element, one of the disk elements configured to maintain the writeable master storage volume, and one or more of the disk elements configured to maintain a corresponding one of the mirrored storage volumes.

16. The system as in claim 15, wherein the network element of a particular storage system is further configured to transmit the first read request to the disk element of the particular storage system without the prepended specified master storage volume pathname prefix.

17. The system as in claim 15, wherein the network element of a particular storage system is further configured to transmit the access request to the disk element configured to maintain the writeable master storage volume in response to the access request having the specified master storage volume pathname prefix.

18. A method for utilizing an administrative path for accessing a writeable master storage volume in a mirrored storage environment, the method comprising:
determining a need to generate an access request for data, the access request to be generated for one of either the writeable master storage volume configured to store a master set of data accessible by a corresponding pathname, or for zero or more read-only mirrored storage volumes for the master storage volume, each mirrored storage volume configured to store a mirrored set of the master set of data, the mirrored set also accessible by the corresponding pathname;
determining a need to generate the access request for the master set of data of the master storage volume; and, in response
transmitting the access request to the master storage volume utilizing a specified master storage volume pathname prefix, the access request having the specified master storage volume pathname prefix prepended to a pathname corresponding to data of the access request.

19. The method as in claim 18, further comprising:
determining the need to generate the access request for the data that is stored on a configured one of either the writeable master storage volume or one of the mirrored storage volumes; and, in response
transmitting a read request to the configured one of either the writeable master storage volume or one of the mirrored storage volumes, the read request having a pathname corresponding to the data of the read request without the prepended specified master storage volume pathname prefix.

20. The method as in claim 19, wherein the access request is the read request, and the configured one of either the writeable master storage volume or one of the mirrored storage volumes is a local storage volume to a client originating the read request.

* * * * *

UNITED STATES PATENT AND TRADEMARK OFFICE
CERTIFICATE OF CORRECTION

PATENT NO. : 8,429,368 B2  
APPLICATION NO. : 12/129904  
DATED : April 23, 2013  
INVENTOR(S) : Michael Eisler et al.

Page 1 of 1

It is certified that error appears in the above-identified patent and that said Letters Patent is hereby corrected as shown below:

In the Claims:

In col. 19, line 24 should read:
Storage volume onto the mirror<u>ed</u> set of one or more mir- Signed and Sealed this
Sixteenth Day of July, 2013

Teresa Stanek Rea
*Acting Director of the United States Patent and Trademark Office*